(12) United States Patent
Jackson et al.

(10) Patent No.: US 8,620,719 B2
(45) Date of Patent: Dec. 31, 2013

(54) METHOD, SYSTEM AND SOFTWARE FOR MANAGING SOFTWARE LICENSE ANNUITIES

(75) Inventors: Wayne Albert Jackson, Wellington (NZ); Vicky Jan McCullough, Auckland (NZ); Sheryl Linda Ching, Mapua (NZ)

(73) Assignee: Accordo Group International Limited, Parnell (NZ)

( * ) Notice: Subject to any disclaimer, the term of this patent is extended or adjusted under 35 U.S.C. 154(b) by 1870 days.

(21) Appl. No.: 11/660,368

(22) PCT Filed: Aug. 16, 2005

(86) PCT No.: PCT/NZ2005/000210
§ 371 (c)(1),
(2), (4) Date: Sep. 17, 2007

(87) PCT Pub. No.: WO2006/019315
PCT Pub. Date: Feb. 23, 2006

(65) Prior Publication Data
US 2008/0133324 A1 Jun. 5, 2008

(30) Foreign Application Priority Data
Aug. 16, 2004 (NZ) .......................................... 534728

(51) Int. Cl.
*G06Q 10/00* (2012.01)
(52) U.S. Cl.
USPC ...................................... 705/7.31; 705/36 R
(58) Field of Classification Search
USPC ............................................ 705/36 R, 7.31
See application file for complete search history.

(56) References Cited

U.S. PATENT DOCUMENTS 5,592,378 A * 1/1997 Cameron et al. ............ 705/26.62
6,513,045 B1 * 1/2003 Casey et al. ............................ 1/1
(Continued)

FOREIGN PATENT DOCUMENTS

| WO | 00/52559 | 9/2000 |
|---|---|---|
| WO | 01/16674 | 3/2001 |
| WO | 2004/042613 | 5/2004 |

OTHER PUBLICATIONS

"ASAP eSMART™ Wins SIIA Codie Award", website http://www.asapsoftware.com/whatsnew/nr2002/nr_020416.htm, printed Nov. 13, 2003, 2 pages.

(Continued)

*Primary Examiner* — Thomas Dixon
*Assistant Examiner* — Gerald Vizvary
(74) *Attorney, Agent, or Firm* — Nixon & Vanderhye P.C.

(57) ABSTRACT

The present invention relates to methods, systems and software for managing software license annuities. The method relates to monitoring renewal revenue, including developing a forecast of renewal revenue, for each of one or more customers, using a customer database; contacting some of the customers to obtain customer profile data; assisting each of the contacted customers to select a renewal option using the customer profile data; modifying the forecast for each of the contacted customers based on the renewal option selected by that customer; and comparing the forecast and the customer's actual renewal purchases to monitor renewal revenue. The followings methods are also disclosed: a computer-implemented method of modelling renewal options, a method of managing annuity renewals, a method of modelling annuity renewals, and a method of displaying customer compliance with a licensing scheme. Systems and software for performing any of the mentioned methods are further disclosed.

6 Claims, 18 Drawing Sheets

(56) References Cited

U.S. PATENT DOCUMENTS

| | | | |
|---|---|---|---|
| 7,197,466 B1* | 3/2007 | Peterson et al. | 705/59 |
| 7,797,214 B2* | 9/2010 | Rosen et al. | 705/36 R |
| 7,899,707 B1* | 3/2011 | Mesaros | 705/14.66 |
| 2002/0103680 A1* | 8/2002 | Newman | 705/4 |
| 2003/0111531 A1* | 6/2003 | Williams | 235/383 |
| 2003/0172020 A1* | 9/2003 | Davies et al. | 705/36 |
| 2005/0278203 A1* | 12/2005 | Monma et al. | 705/7 |
| 2007/0162365 A1* | 7/2007 | Weinreb | 705/35 |
| 2008/0133324 A1* | 6/2008 | Jackson et al. | 705/10 |
| 2009/0144171 A1* | 6/2009 | Whitehead | 705/26 |

OTHER PUBLICATIONS

Iwanski, *Windows & Net Magazine*, "Asset and License Management", May 2002, pp. 83-85.

Nielson, Storage Management Solutions, "Migraine Relief For Software Management And License Administration", undated, 4 pages.

Computerworld, "License Tracker Launched As Microsoft Dead Looms", website http://www.computerworld.com/databasetopics/data/story/0,10801,72713,00.html, printed Nov. 13, 2003, 4 pages.

First Technology Ltd—Press Release—"First Technology launches software asset tracker", website: http://www.itweb.co.za/office/first-technology/0205170803.htm, printed Nov. 13, 2003, 2 pages.

Belarc—PC Management For the Internet Age, "U.S. Marine Corps using Belarc's system to manage 70,000 PCs worldwide", website http://belarc.com/press_rels/pr-08132002.html, printed Nov. 13, 2003, 1 page.

Belarc—PC Management For the Internet Age, "Web PC Management Service for All", website http://belarc.com/press_rels/pr-07302001.html, printed Nov. 13, 2003, 1 page.

beITsmart PC Management for the Internet Age—"About beITsmart", website https://www.beitsmart.com/about/overview.asp, printed Nov. 13, 2003, 2 pages.

PC Premier Computing "Centennial Discovery", website http://www.premier-computing.co.uk/products/centennial_discovery.html, printed Nov. 13, 2003, 2 pages.

Centennial Discovery, "The Next Generation Network Inventory Tracking Tool", printed Jun. 2002, 6 pages.

PC Premier Computing "The Issue Software License Compliance", website http://www.premier-computing.co.uk/Software_compliance.htm, printed Nov. 13, 2003, 2 pages.

Express Metrix, LLC, "Express Software Manager™ Integrated Inventory and metering for smart IT asset management", Version 6.2, © 2002, 2 pages.

Website http://www.sintegrators.com/product/Content_Product.htm, dated Jun. 1, 2003, 6 pages.

License Metering Information, website http://sintegrators.com/licmetering/Content Licmetering.htm, printed Nov. 13, 2003, 2 pages.

\* cited by examiner

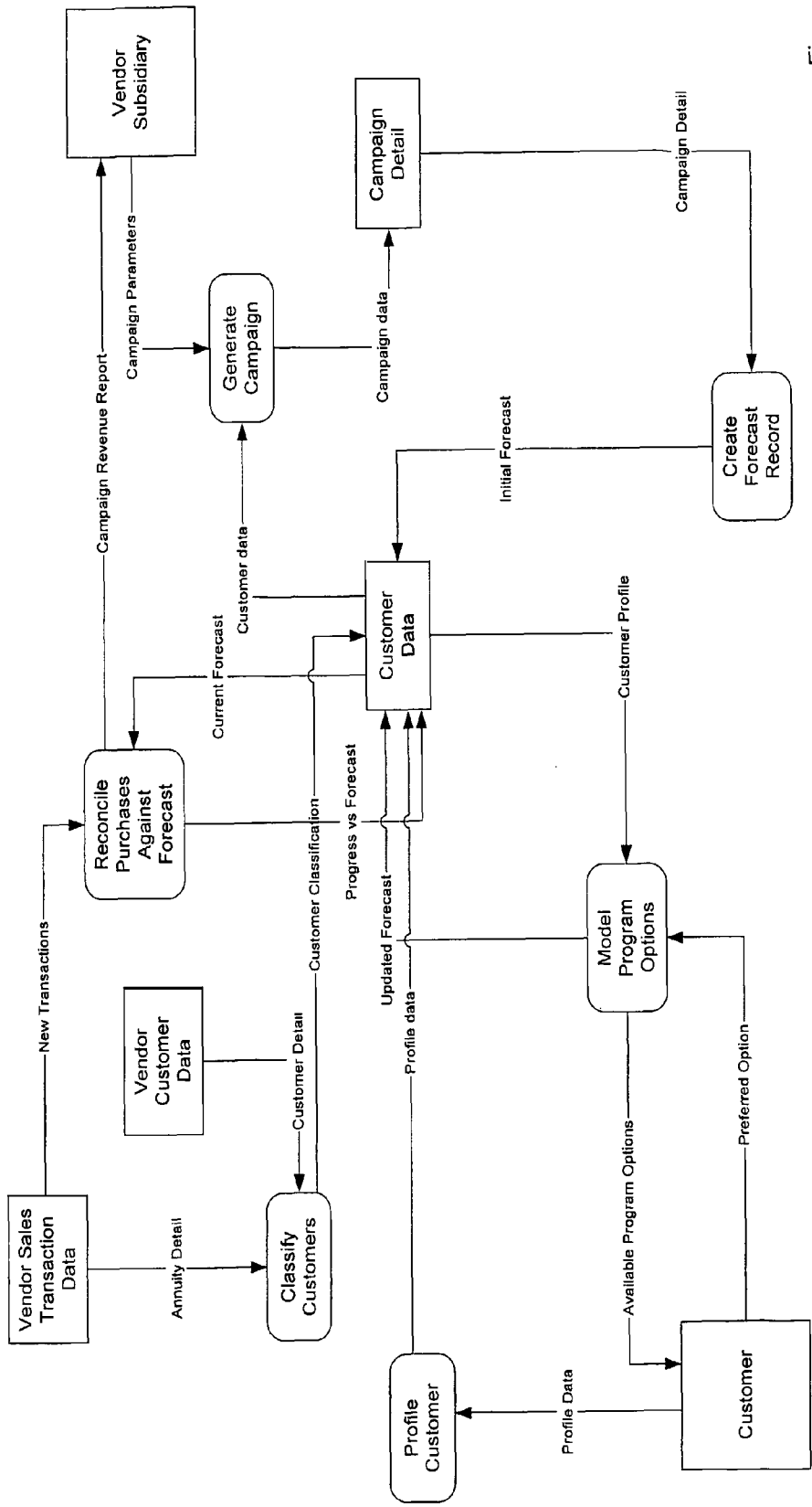

Acme Engineering Limited
Renewal License Summary

| Product | License Program | Current Entitlement | Expiry Month | Licenses |
|---|---|---|---|---|
| Application XYZ | Annuity Prog A | 2.40 | Mar-04 | 56 |
| Application PQR | Annuity Prog B | 1.10 | Mar-04 | 12 |
| Application MNO | Annuity Prog A | 10.00 | Apr-04 | 105 |

Figure 1a

Customer Classification

This screen allows the classification of annuity customers into one of three Annuity Groups.

Select Classificastion Criteria:

|  | Group 1 Limit | Group 2 Limit | Group 3 Limit |
|---|---|---|---|
| Number of Devices: | 50 | 500 | 10,000 |
| Total Annuity Revenue: | $3,000 | $50,000 | $1,000,000 |

Select Group Criteria:

Customer Segment: All Segments

Number of Devices: Between 0 and 9999

[Classify Group] [Classify Active Customer] [Reset All]

Figure 2a

Campaign Generation

This screen allows the generation of a campaign list based on selected criteria.

Choose Campaign Name: [ANNUITY_NZ_Jul04_1]

Select Annuity Expiry Timeframe:  From [June-04] To [Sept-04]

Select by Classification Group and/or by Devices and Annuity Value

- ☑ By Group: [Group 2]

- ☐ By Devices: Between [0] and [9999]

- ☐ By Revenue: Between [$3,000] and [$500,000]

[Generate Campaign]  [Reset All]

Summary of Licensing Scenarios

The best four licensing scenarios (combination of eligible options) are shown, together with the License-Only (non-Annuity) combination.

| | 1 | 2 | 3 | 4 | 5 |
|---|---|---|---|---|---|
| Applications | Ent A $868,000 | Select A $984,000 | Ent A $1,021,000 | Open Vol $1,132,000 | L Only $1,224,000 |
| Servers | Ent A $432,000 | Select A $297,000 | Select A $297,000 | Open Vol $370,000 | L Only $269,000 |
| Systems | Ent A $285,000 | Select A $372,000 | Ent A $335,000 | Open Vol $459,000 | L Only $416,000 |
| Total Cost | $1,585,000 | $1,650,000 | $1,655,000 | $1,909,000 | $1,961,000 |

| | |
|---|---|
| Level A | 300 devices |
| Level B | 700 devices |
| Level C | 1100 devices |
| | |
| Actual customer devices | 656 devices |
| Difference to next level | 44 devices |

METHOD, SYSTEM AND SOFTWARE FOR MANAGING SOFTWARE LICENSE ANNUITIES

This application is the US national phase of international application PCT/NZ2005/000210 filed 16 Aug. 2005, which designated the U.S. and claims priority to NZ 534728 filed 16 Aug. 2004, the entire contents of each of which are hereby incorporated by reference.

FIELD OF INVENTION

The present invention relates to a method, system and software for managing software license annuities. More particularly, but not exclusively, the present invention relates to a method, system and software for assisting a vendor to monitor customer renewal of software license annuities and provide annuity renewal options for the customer.

BACKGROUND TO THE INVENTION

An annuity license is where the customer pays an annual fee, in return for which they are automatically entitled to any new version of the product that is released during the contract period. Typically, the license must be purchased before it can be placed under an annuity contract. At the end of the contact period, the customer may have the option to renew the annuity coverage for a further term. This renewal opportunity is usually restricted to a specified time period beyond the actual expiry date.

An example of an annuity license program is Software Assurance™, provided as one of Microsoft's™ volume license programs. Software Assurance has a term of 2 or 3 years. It must be purchased as an additional item to the actual license purchase, and this must be done at the time of the license purchase.

If a company purchases a copy of Office 2003 under a Microsoft volume license program, then at the time of purchase they have the option to also purchase Software Assurance for that license. If they do so, then when a subsequent version (such as Office 2005) is released, they automatically gain entitlement to use this new version. When the Software Assurance coverage expires, they can renew it without re-purchasing the license, and continue to gain entitlement to new versions. If the annuity coverage is not renewed within 90 days of expiry, then it lapses and becomes non-renewable.

If the company does not purchase Software Assurance at the time of the license purchase, then they cannot add it at a later time, and can only acquire entitlement to Office 2005 by purchasing a full new license.

There are some exceptions to this general position. For example, if the company purchases Office 2003 as a retail or OEM license (i.e. not under a volume license program), then they have 90 days to enrol this license in Software Assurance.

The cost of enrolling a license in Software Assurance is between 25% and 30% of the license cost, depending on the product.

Software vendors, such as Microsoft, favour annuity transactions because they provide a steady and predictable revenue stream. They are considered preferable to ad hoc purchases and upgrades which are unpredictable and vulnerable in the case of economic downturns as customers have the option of delaying the move to a later version.

However, there is a significant vulnerability at the time of renewal, particularly if customers feel they have not received value for their annuity contract. Because customers have a 90 day window in which to renew, the software vendor wants to be sure they do not slip out of the program, and also want to ensure they appreciate the value of renewing. Customers who do exit the program will do so owning the latest versions of their preferred products, so are unlikely to be candidates for new license purchases for some years.

The challenge for the vendor is to monitor customers coming up for renewal, provide them with informed advice, ensure they understand the benefits of renewing, and help them choose the best renewal program.

At present the only methods for assisting the vendor with this process are semi-manual routines which extract raw transaction data into spreadsheet format then use a combination of manipulation and filtering to produce customer lists and transaction lists pertaining to expiring annuity licenses. Typically, spreadsheet extracts are sent to customers with an accompanying letter, and followed up by a telephone call to discuss renewal options.

This semi-manual, spreadsheet-based approach has a number of disadvantages:

There is no underlying database structure to allow methodical targeting and management of the whole annuity customer population. The spreadsheet lists are standalone and difficult to coordinate.

Spreadsheet data is very vulnerable to accidental corruption.

The transaction data is of limited use in its raw form. It needs to be analysed and classified before reliable and useful conclusions can be drawn from it.

The raw data, even after spreadsheet manipulation, is not suitable for sending to customers as the basis for a subsequent call to discuss annuity renewals.

Annuity licenses have the potential to earn new versions of the licensed product. However, the raw data contains no record of new entitlements. The calculation of new entitlements requires an accurate and complete catalogue of product versions and their release dates, combined with an automated method for comparing annuity transaction data to this catalogue to infer any new versions earned.

It is an object of the present invention to provide a method, system and software which assists the vendor in the renewal process and avoids the disadvantages of the prior art, or to at least provide a useful alternative.

SUMMARY OF THE INVENTION

According to a first aspect of the invention there is provided a method of monitoring renewal revenue, including the steps of:

i) Developing a forecast of renewal revenue, for each of one or more customers, using a customer database;

ii) Contacting some of the customers to obtain customer profile data;

iii) Assisting each of the contacted customers to select a renewal option using the customer profile data;

iv) Modifying the forecast for each of the contacted customers based on the renewal option selected by that customer; and v) Comparing the forecast and the customers actual renewal purchases to monitor renewal revenue.

Preferably, the customer profile data includes proposed renewal quantities, any indicated new annuity purchases, and/or forecasted growth.

It is preferred that the customers are assisted in step (iii) by the use of a modelling engine. It is further preferred that the modelling engine displays eligible programs graphically and/or that the modelling engine displays ineligible programs graphically.

Where ineligible programs are displayed, the graphical display of the ineligible programs may include highlighting proximity to the lowest eligibility threshold.

Where eligible programs are displayed, the graphical display of the eligible programs may include highlighting key features. The key features highlighted may be total cost under this program, proximity to higher discount levels, and/or proximity to lower discount levels.

It is preferred that the renewal option is a combination of eligible programs and the modelling engine calculates the costs associated with each combination of eligible programs.

Preferably, the modelling engine applies one or more rules relating to allowable combinations of eligible programs. It is also preferred that the modelling engine displays the best renewal options in ranked order.

The modelling engine may also calculate and display the costs, for the customer, of acquiring new versions of software as full licenses.

The modelling engine may be a computer program executing on a computer system.

It is preferred the customers are contacted on the basis of customer segment, annuity expiry window, and/or number of customers.

Preferably, steps (i), (iv), and (v) are performed by a computer system.

According to a second aspect of the invention there is provided a method of modelling renewal options, including the steps of:
i) Collating sales data into a customer database;
ii) Collating customer profile data into the customer database; and
iii) Modelling possible renewal programs depending on customer data extracted from the customer database;
wherein the customer data is related to both sets of data provided in steps (i) and (ii).

Preferably, the sales data is vendor sales transaction data.

It is preferred that the customer profile data is obtained by contacting the customer.

The modelling in step (iii) may be performed by a modelling engine and it is preferred that the modelling engine displays possible renewal programs graphically. It is also preferred that the modelling engine calculates the costs associated with each possible renewal program, applies some rules relating to allowable combinations within each renewal program, and displays the best renewal options in ranked order.

The graphical display of the possible renewal programs may include highlighting key features. The key features highlighted may be the set of total cost under this program, proximity to higher discount levels and/or proximity to lower discount levels.

The modelling engine may also calculate and display the costs, for the customer, of acquiring new versions of software as full licenses.

According to a third aspect of the invention there is provided a method of managing annuity renewals, including the steps of:
i) Classifying customers using sales transaction data;
ii) Collating the customer classification data into a customer database;
iii) Generating a list of customers using customer data extracted from the customer database;
iv) Generating a renewal revenue forecast for each customer on the list based on the customer data;
v) Contacting the customers on the list to obtain customer profile data;
vi) Generating renewal options for each customer using customer profile data;
vii) Receiving an option selected by each customer;
viii) Updating each forecast using the corresponding selected option;
ix) Comparing the progress of each customer with the corresponding forecast using customer purchase data extracted from the sales transaction database; and
x) Collating the comparison data from step (ix) into the customer database.

The customers may be classified in step (i) by also using customer data from the vendor.

Preferably, the sales transaction data is from the vendor.

It is preferred that the customer data is related to the customer classification data.

According to a fourth aspect of the invention there is provided a method of modelling annuity renewals, including the steps of:
i) obtaining renewal quantities, device profile, and upgrade intentions over a time period for a customer;
ii) calculating eligibility for license programs;
iii) calculating costs for each eligible license program;
iv) creating licensing scenarios using the eligible license programs; and
v) displaying the scenarios to a user in graphical form.

Preferably the method includes the step of ranking the licensing scenarios based on cost and/or other parameters.

Preferably the method also includes the step of calculating values and benefits for each scenario.

According to a fifth aspect of the invention there is provided a method of displaying customer compliance with a licensing scheme, including the steps of:
i) displaying points requirements for a plurality of licensing levels for the scheme using a first graphical characteristic; and
ii) displaying actual points accrued by the customer using a second graphical characteristic.

The first graphical characteristic may be a measurement graphic which shows the requirements for licensing levels as measurement marks.

The second graphical characteristic may be a pattern or colour which fills the measurement graphic to the extent of the actual points accrued. It is preferred that the pattern or colour of the second graphical characteristic is based on the proximity of the actual points to the points requirement of the next highest licensing level.

Preferably, the first and/or second graphical characteristic can be actuated by a user and wherein, upon actuation, details of the actual points and difference between actual points and the points requirement for the next highest licensing level may be displayed. The actuation may be the clicking on the characteristic within a graphical user interface (GUI) by a pointing device.

The points may be accrued by the customer purchasing licenses.

The points requirements may correspond to the device numbers required for each licensing level and actual points accrued may correspond to the actual device numbers of the customer.

According to a sixth aspect of the invention there is provided a method of displaying a summary of a software licensing scenario, including the steps of:
i) displaying a total cost of a software licensing scenario over a time period using a first graphical characteristic; and ii) displaying a plurality of annual costs for the software licensing scenario over the time period using a plurality of second graphical characteristics.

The first graphical characteristic may be a first bar and may be vertical.

The second graphical characteristic may be a second bar.

It is preferred that the second bar is thinner than the first bar and overlaid on top of the first bar. It is further preferred that the second bar has the same orientation as the first bar.

A plurality of summaries of software licensing scenarios may be displayed within the same screen using the method of the sixth aspect.

According to a further aspect of the invention there is provided a system for implementing the methods of any one of the first to sixth aspects of the invention.

According to a further aspect of the invention there is provided software for effecting the methods of any one of the first to sixth aspects of the invention.

BRIEF DESCRIPTION OF THE DRAWINGS

Embodiments of the invention will now be described, by way of example only, with reference to the accompanying drawings in which:

FIG. 1: shows a flow diagram illustrating the data flow within a preferred embodiment of the invention.

FIG. 1a: shows an example of a report summarising expiring annuity transactions.

FIG. 2a: shows a screenshot illustrating how customer can be classified.

FIG. 2b: shows a screenshot illustrating how a campaign can be generated.

FIG. 7: shows a screenshot illustrating how renewal quantities of a customer can be captured.

FIG. 8: shows a screenshot illustrating how the device profile of a customer can be captured.

FIG. 11: shows a screenshot displaying the licensing programs the customer is eligible for.

DETAILED DESCRIPTION OF PREFERRED EMBODIMENTS

Figure 2:
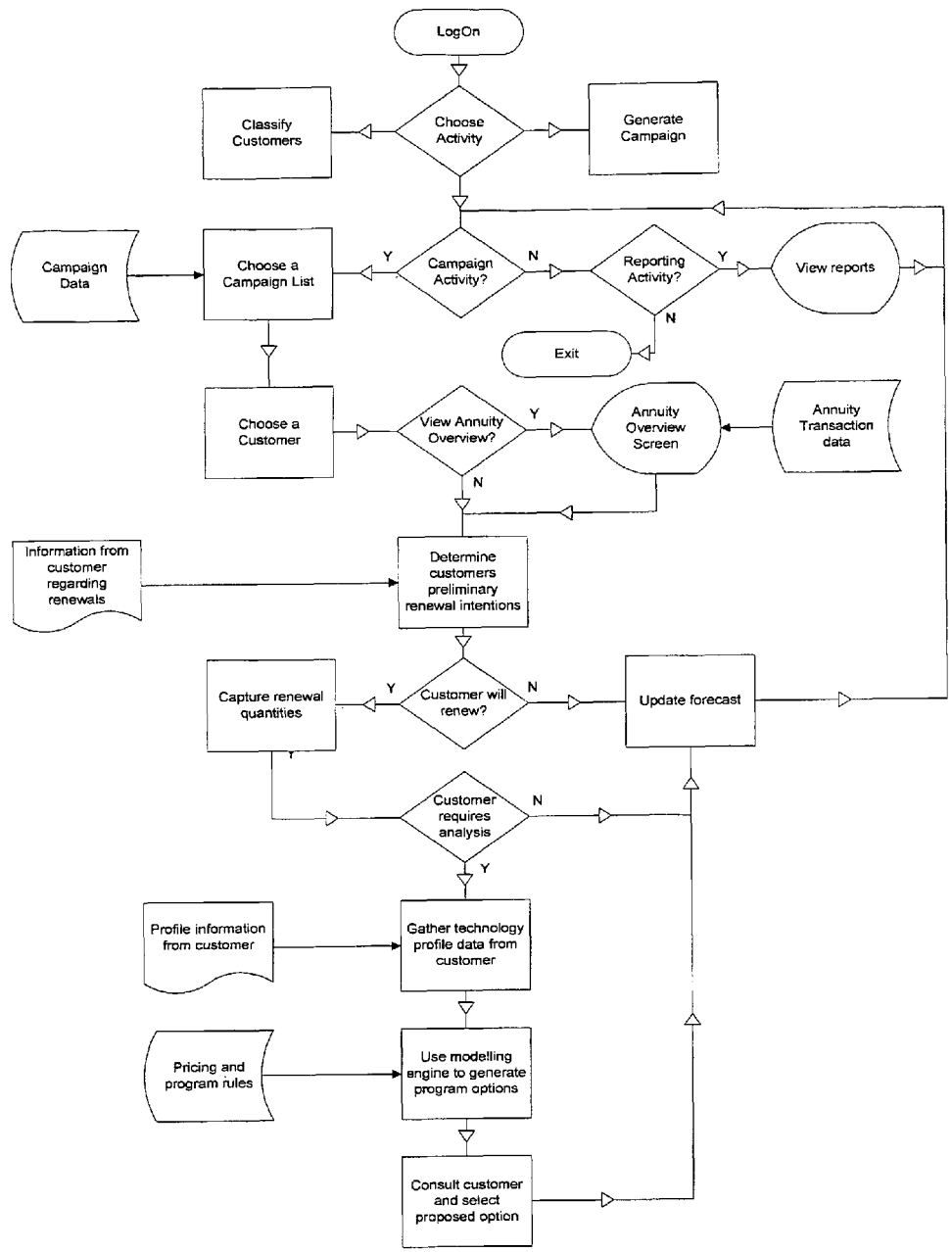
FIG. 2: shows a flow diagram illustrating a method of the invention.

The present invention is designed to help a vendor manage the process of monitoring customer annuity renewals for software licenses and providing useful annuity renewal options.

The method and system of the invention provides the following functions:

Interprets and analyses vendor sales transaction data to show which customers are coming up for renewal, and the value of their renewal activity;

Classifies customers according to their overall annuity profile;

Produces a customer-ready report showing annuity licenses, expiry dates, and version entitlement.

Manages campaigns and tracks progress of customer renewal activity, together with campaign activity for each customer.

Provides screens to gather data from customers and automatically models renewal program options;

Displays a comparative analysis of program options with a full breakdown of costs and benefits;

Tracks actual renewal revenue against forecasted revenue.

The present invention overcomes some of the disadvantages of the prior art by utilising the underlying database structure of the system described in PCT/NZ03/00248, the contents of which is herein incorporated by reference.

Data Flow Method

FIG. 1 shows how the system of the invention works from the perspective of data production, manipulation and storage.

The system has two main sources of data:

Vendor Sales Transaction Data

Vendor Customer Data

The vendor sales transaction data consists of relevant information about annuity sales. Typical data fields include sale date, product part, purchase quantity, license type, agreement id, agreement expiry date, reseller, and sale price. This data is the primary raw data for the system, both in terms of triggering annuity campaign activity (expiring annuity), and also measuring the success of the campaign activity (annuity renewals)

The majority of the vendor customer data is not gathered by the system, but may be refined, corrected and augmented by the system during the course of campaign activity. Typical data fields are company name, address, phone number, contact name, email, number of PCs, and customer segment (e.g. large account or medium account).

These two sources of data are supplied primarily by the vendor whose annuity licensing is the subject of the system. Between them they provide all necessary information about the customers being monitored by the system (including contact information and number of devices—PCs together with details of all relevant license transaction activity. These details include which products have been the subject of annuity contracts, part numbers, quantities, agreement types, agreement start dates, agreement end dates, agreement reference numbers, resellers, version entitlements, billing cycles, sale price, and renewal price.

These main sources of data are updated periodically (e.g. monthly) with new or changed data, as it becomes available to the vendor.

The system extracts data from these two main sources and creates some specific Customer Data of its own, for the purposes of analysing and reporting on annuity licensing for a customer or group of customers. This Customer Data may include some information sourced directly from the Vendor Customer Data, but will also include information derived from processes within the system itself and as a result of campaign activity. Subsets of data under this heading include customer classification, annuity forecast information, technology profile, and campaign participation.

Customers are classified to ensure they can be targeted in a manner which corresponds to their size, importance, and the overall value of their annuity activity.

The classification process takes information about each customer, such as size, value of total annuity, and annuity potential, and assigns an "annuity classification". It is this classification which largely determines how the system will deal with this customer—in terms of inclusion in campaigns, and means of contact.

The classification is used, along with parameters supplied by a Vendor Subsidiary, to produce campaign lists. Parameters supplied might include the size of customer to be targeted (e.g. between 50 and 100 devices, between 100 and 200 devices etc), the expiry period to be targeted (e.g. customers with annuity expiring for the next three months), the minimum annuity value (e.g. customers with a minimum of $5,000 of expiring annuity), and customers to be excluded form the process (e.g. those who are already discussing renewals with a reseller or Account Manager).

The campaign parameters supplied by the Vendor Subsidiary are matched against the customer classification and annuity transaction data to produce a target campaign list. The process also gathers together the relevant expiring annuity data needed for the creation of an initial forecast record The campaign lists will generally be targeted towards those customers with expiring annuity within a specific time period (e.g. the next three months). The list may not be exhaustive of all such customers, but may be limited to the highest value customers.

A vendor organization can be represented by subsidiary organizations in several different areas, each with its own group of customers, and different vendor subsidiaries may require the system to operate in different ways. Therefore campaign parameters are provided by the Vendor Subsidiary which will also be the recipient of campaign reports produced by the system.

The system stores information about campaigns in a Campaign Detail database for the purpose of managing the campaign activity and also for subsequent reporting back to the vendor. The Campaign Detail database includes such fields as campaign name, location, start date, customer ids, and expected revenue As well as drawing from the vendor-supplied customer data, the system stores its own data about customers, and updates it during the lifetime of the system. This data includes a forecast record which is associated with each customer in each campaign. The forecast record is initially set to a value based on the expiring annuity (for example. 30% of expiring annuity), and updated as more information is gathered about the customer's renewal intentions. When new transaction data is supplied by the vendor, it is reconciled against the forecast record for each customer, to determine the extent to which forecasted renewals have been realised.

A reconciliation report can be generated showing the extent to which forecast expectations have been met by actual renewal transactions. The following table shows an example of a reconciliation report:

| Forecast Renewal | | | Actual Renewal | | Achievement | |
|---|---|---|---|---|---|---|
| Product | Quantity | Date | Quantity | Date | Shortfall | Value |
| ABC Prod | 50 | March 2004 | 22 26 | March 2004 June 2004 | −2 | −$2,400 |

During the course of a campaign, contact is made with the customers on the campaign list.

The first contact is a letter which is sent together with a summary of expiring annuity transactions produced by the system. This report also shows the current version entitlement of the software product covered by each annuity transaction (e.g. customer has 50 copies of product X covered by annuity, which expires on dd-mm-yyyy. The version owned as a result of annuity coverage is 4.50): FIG. 1a shows an example of a report summarising expiring annuity transactions for a customer.

A short time after the letter is sent, the customer is contacted by a user of the system and the system is used to record information about the customer's renewal intentions.

Customers will fall within one of three categories:
1) Not intending to renew their annuity licenses
2) Intending to renew all or some of their annuity licenses
3) Unsure of intentions regarding their annuity licenses In the first two cases, the system records these intentions and revises the forecast accordingly. In the third case, further contact is initiated with the customer and information gathered about their technology profile and possible renewal quantities. The information required as part of the technology profile includes: Total number of devices in the organisation, planned growth/decline in device numbers over the next 3-6 years, planned deployment quantity and timeframe for each product under consideration. For example, a customer may report that they currently have 750 devices, but this is likely to grow by 5% each year for the next 3 years, and then remain stable for the following 3 years. They plan to deploy 500 copies of Version 2.00 of Product XYZ in 2005, then a further 200 copies in 2006. Similar figures would be captured for all relevant products.

The number of devices is primarily used to calculate license requirements under programs which are based on enterprise coverage (i.e. one copy per device). The deployment intentions are used to calculate the license purchase requirement for products which are not covered by annuity contracts, in order to provide a comparison between renewal and non-renewal options.

The system's modelling engine uses this data to determine which license program options are available to this customer and provide a breakdown of associated costs and benefits. The available options are relayed to the customer in a system-generated report, and the customer is helped to decide the best option.

Each vendor has different license program offerings with associated rules/prices. The modelling engine of the system is designed to convert the customer's renewal and upgrade intentions into a detailed set of program options.

When the customer selects their preferred option, the forecast record is revised accordingly.

As new transaction data is received by the system, annuity renewals are identified and matched to forecasted intentions for each customer. This allows reporting back to the vendor on the progress of the campaign and the extent to which forecast expectations are realised.

Software Implementation of the Invention

Referring to FIG. 2, a software implementation of the invention will be described.

A user logs on to the system. In this example the system is accessed using a web browser.

The user can choose to classify customers. FIG. 2a shows how the customers can be classified. The amount of annuity renewals by a customer, total number of devices, amount of renewal falling due within a specified time period are all parameters that can be used to classify the customers.

The user can choose to generate a campaign. FIG. 2b shows how a campaign can be generated. A user can provide one or more parameters, such as annuity renewals falling due within specified time, size of customer, or size of annuity renewal. The parameters may ultimately be provided by a vendor subsidiary who wishes to target a certain portion of their customer base for renewal monitoring.

Figure 3:
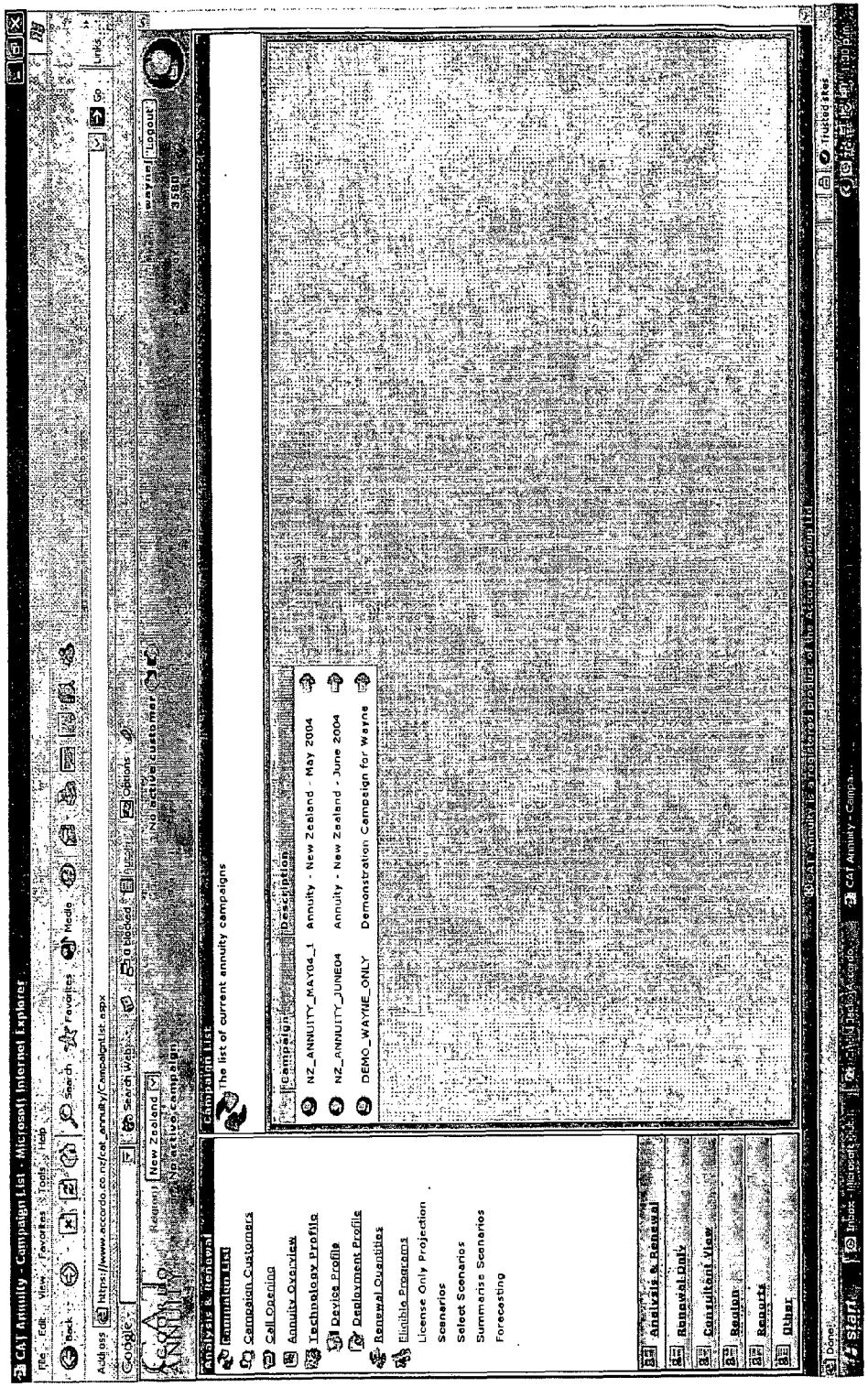
FIG. 3: shows a screenshot illustrating how campaigns could be selected within the invention.
Figure 4:
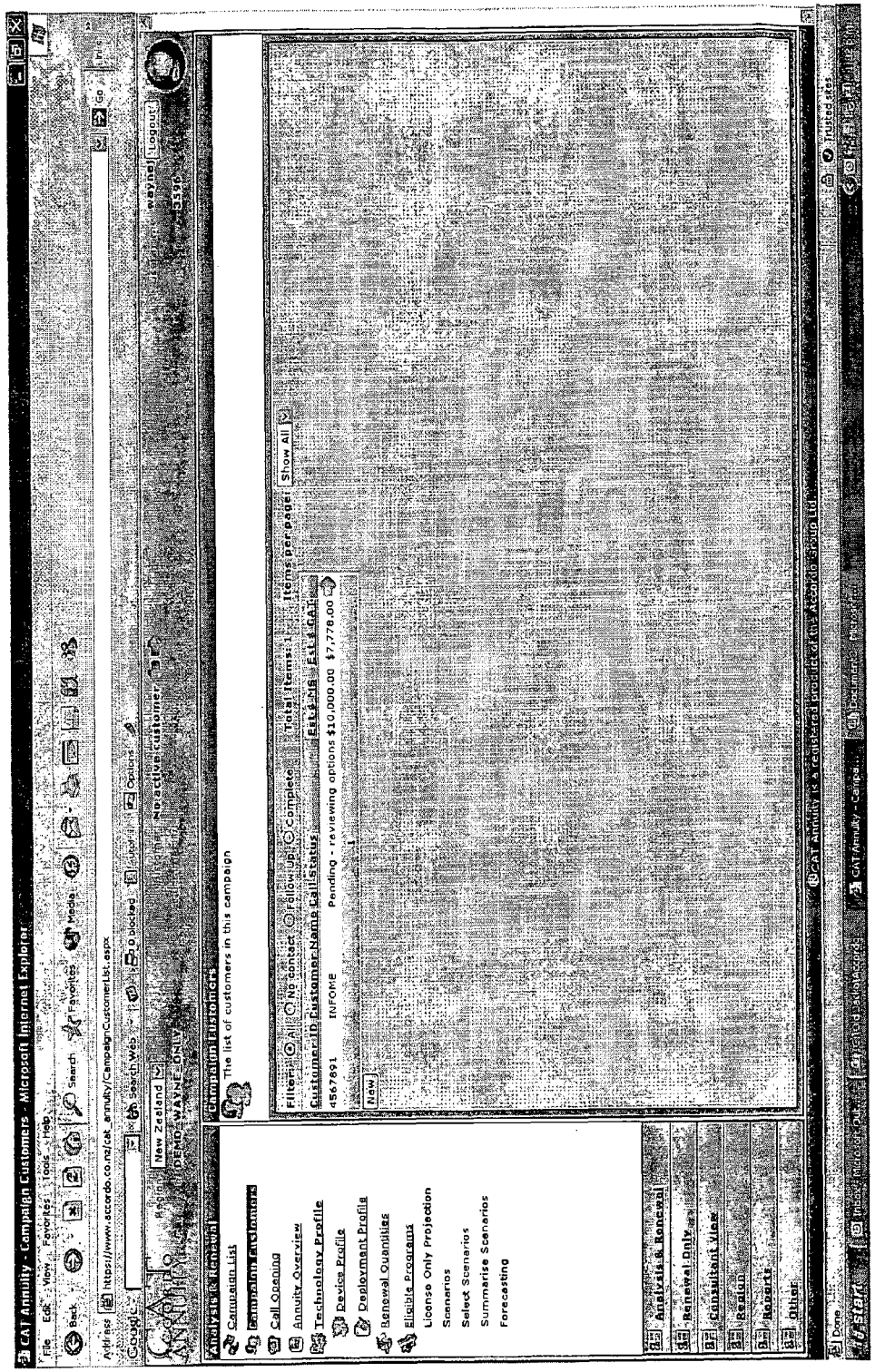
FIG. 4: shows a screenshot listing the customers within a selected campaign.

If there are existing campaigns the user can select a campaign list and a customer from the campaign list. FIG. 3 shows a campaign list screen of campaigns created as described above. FIG. 4 shows a list of customers within a selected campaign. Additional information is provided with the customer, such as present contact status (i.e. when the customer was last contacted), estimated renewal revenue, and estimated future renewal revenue.

Figure 5:
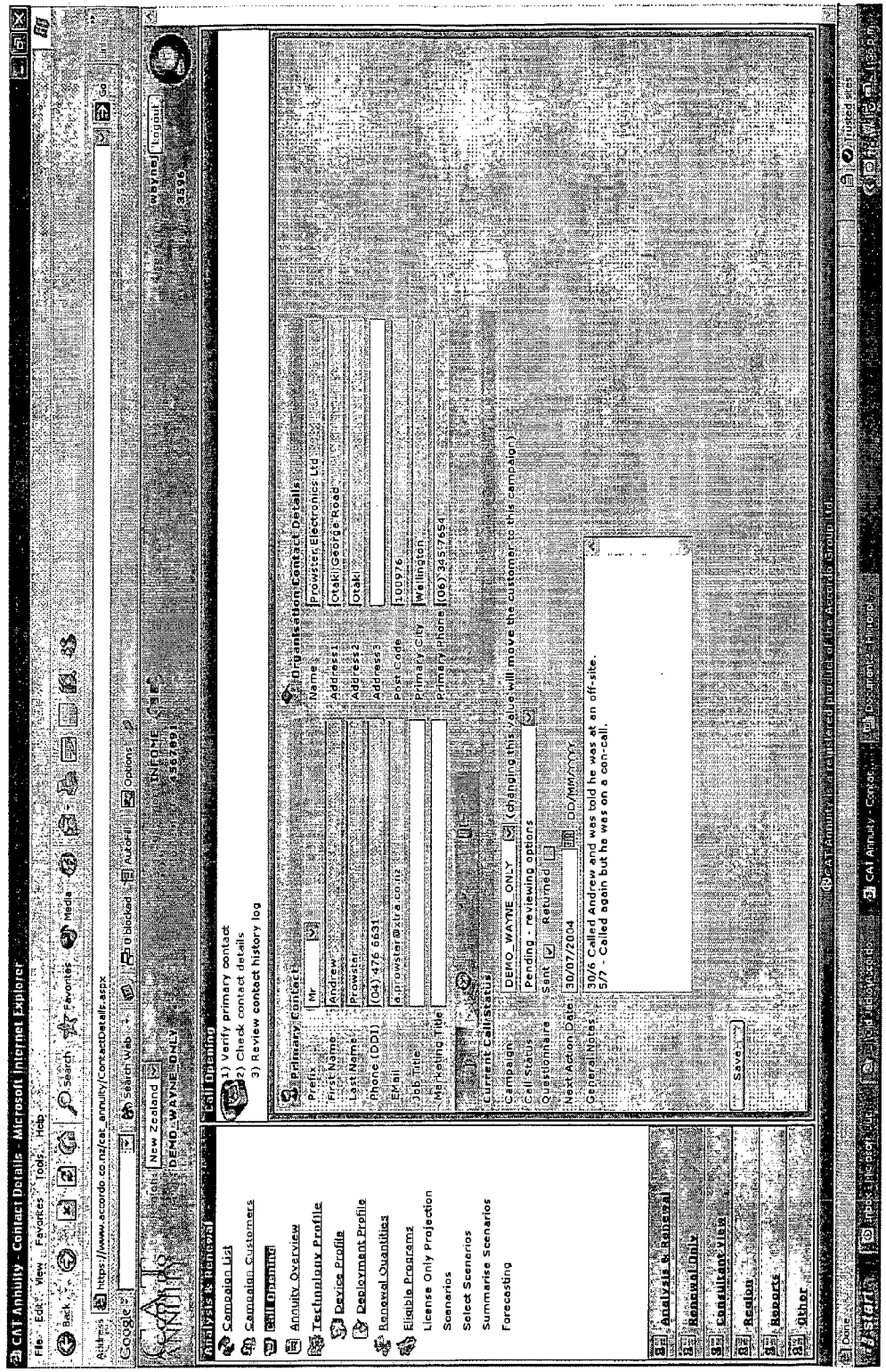
FIG. 5: shows a screenshot illustrating a calling screen for contacting the customers within a campaign.

The customer is contacted by the user. A customer calling screen is shown in FIG. 5. This screen shows details about the customer, such as contact name, contact phone numbers, contact email address, contact postal address, job title, preferred reseller, current campaign status, contact history, date of next contact, and notes on previous contacts.

Figure 6:
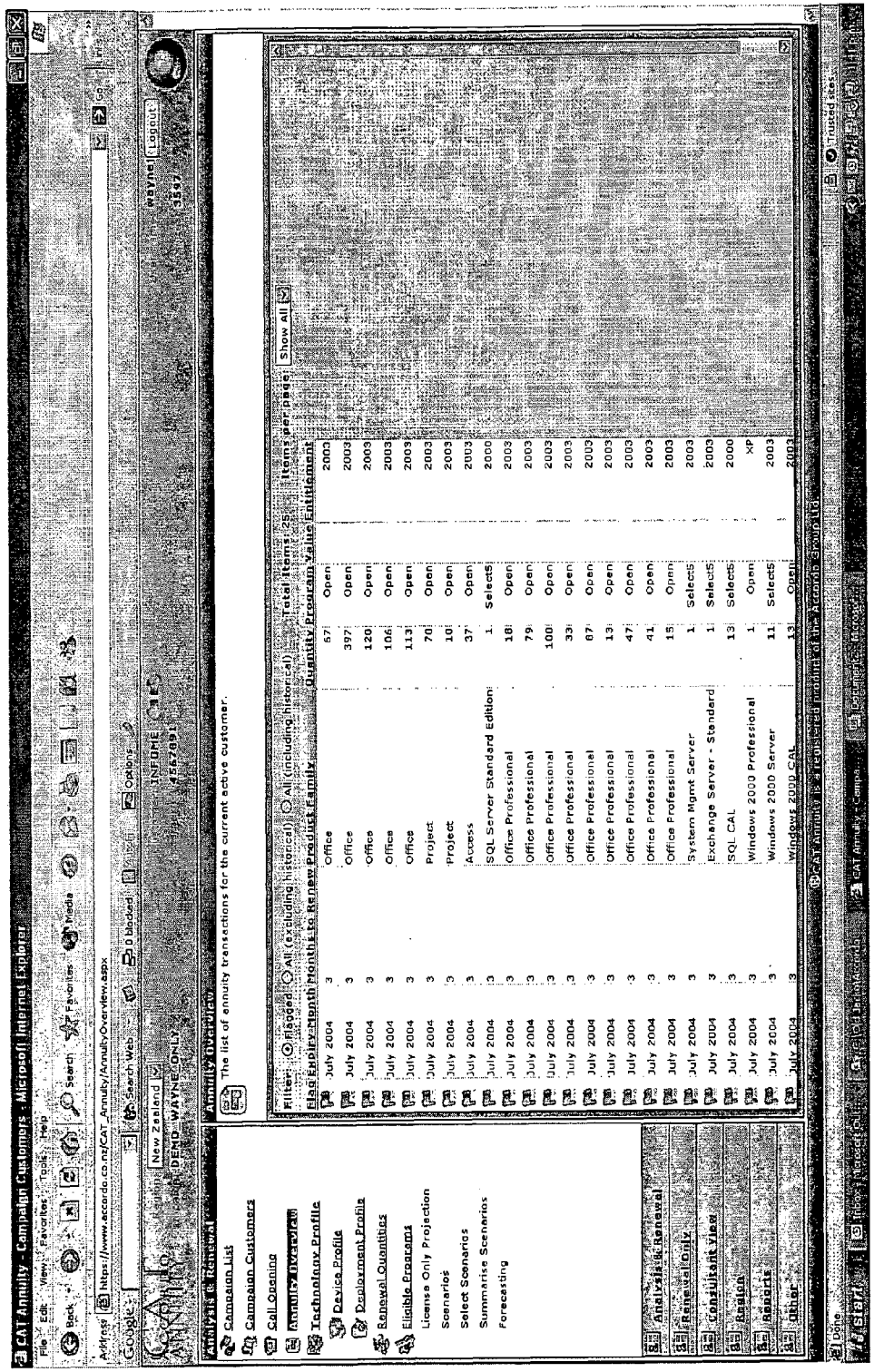
FIG. 6: shows a screenshot of an annuity overview for a customer.

The annuity overview of the customer can be viewed. FIG. 6 shows the annuity overview of a customer. The annuity overview includes the expiry dates of existing licenses, amount of time to renew the license under the annuity program, type of product, total number of licenses, which licensing program the product is licensed under, and entitlement. The purpose of this annuity overview screen is to allow the user of the system to quickly and easily view the relevant details of expiring annuity for this customer. It also provides a history of annuity transactions, and puts a meaningful flag alongside those that need attention. Expiring transactions needing urgent attention are highlighted more boldly than those considered less urgent. Access to this summary screens assists a system user during interactive conversations with campaign customers.

The user initiates a discussion with the customer based around the renewal summary report which has been sent with the letter. A general summary of the customer's renewal intentions is recorded by setting the appropriate status in the customer calling screen. For example, the status may be set to "Pending—reviewing options", "Completed—will not renew", "Completed—will renew all", "Completed—will renew some" etc. If the customer intends to renew and is able to give a comprehensive summary of renewal products and quantities then these are recorded via the Product Renewals screen.

If the customer is not going to renew any of their existing software licenses then a forecast for the customer is updated.

Figure 7:
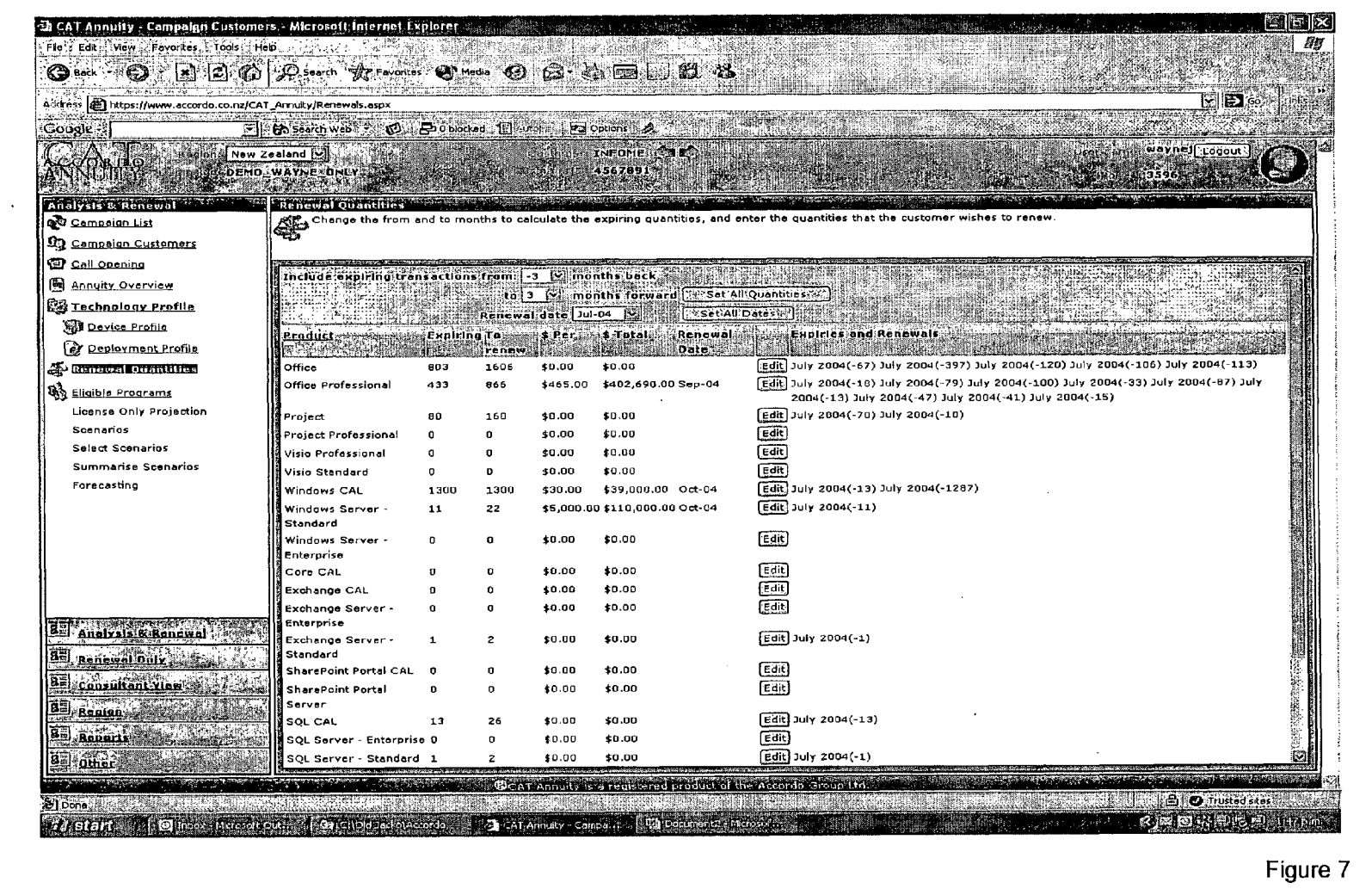

If the customer is going to renew their existing software licenses, then the quantities of software license annuities are captured from the customer. FIG. 7 shows a screen where the renewal quantities for a customer can be captured. For each product, the number of expiring licenses is shown and the number of licenses to renew can be edited. The per-product cost for the license is shown along with the total cost to renew all the licenses. The date of renewal is also shown. As the licenses for a product may fall due for renewal at different times a column is provided to show the different renewal dates combined with the number of licenses expiring at that date.

If the customer requires further analysis of the renewal options then technology profile data is captured from the customer. Technology profile data includes the current number of devices for the customer, any expected increase in devices, the total number of currently deployed products, and any expected future deployment.

The capture of technology profile data is explained in detail with reference to FIGS. 8 to 10.

Figure 8:
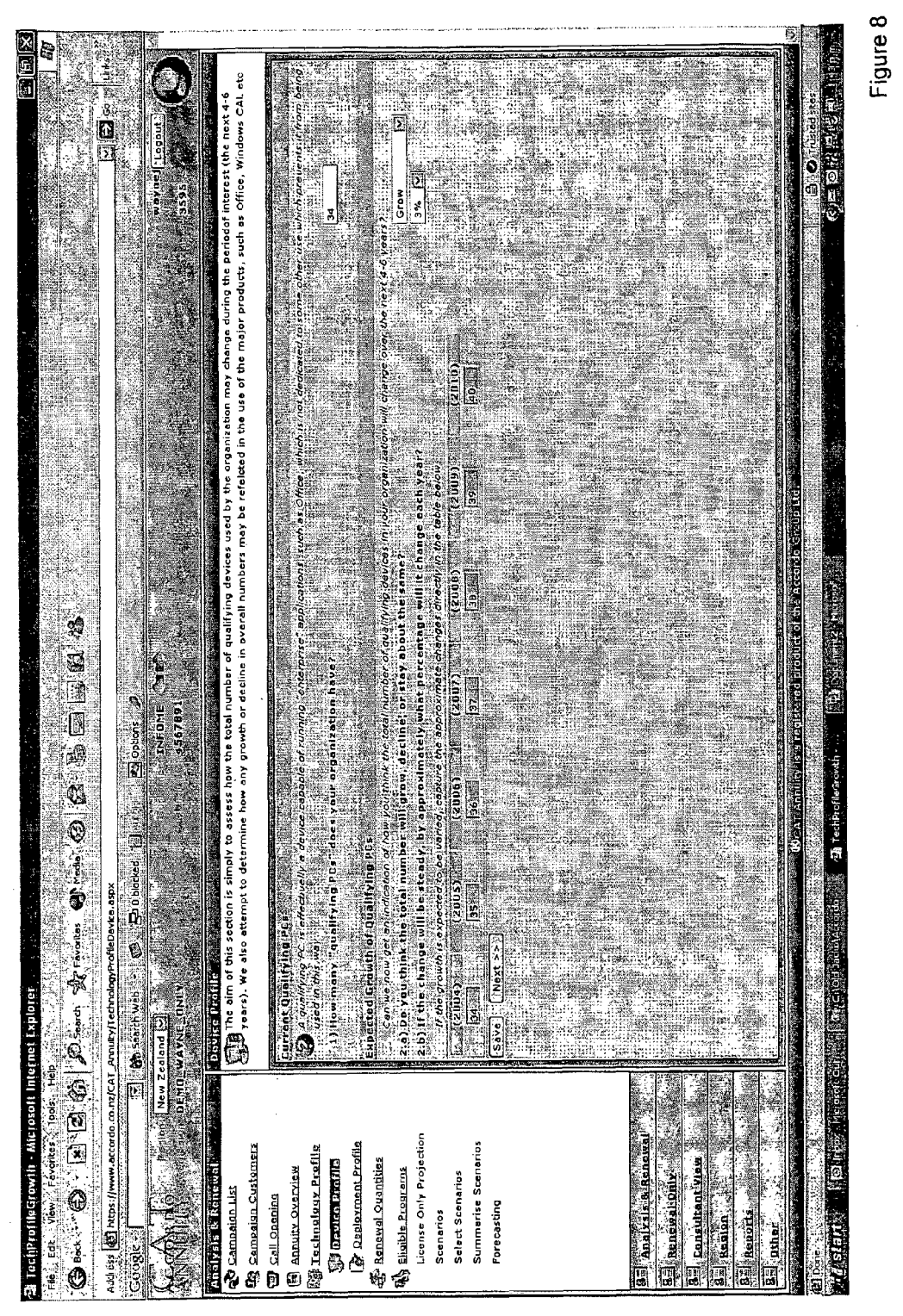

FIG. 8 shows a screen for the capture of the device profile. The device profile identifies the number of devices that would need to be licensed under a company-wide style of licensing agreement (i.e. a licensing agreement that requires each eligible device to be licensed for a particular product).

Figure 9:
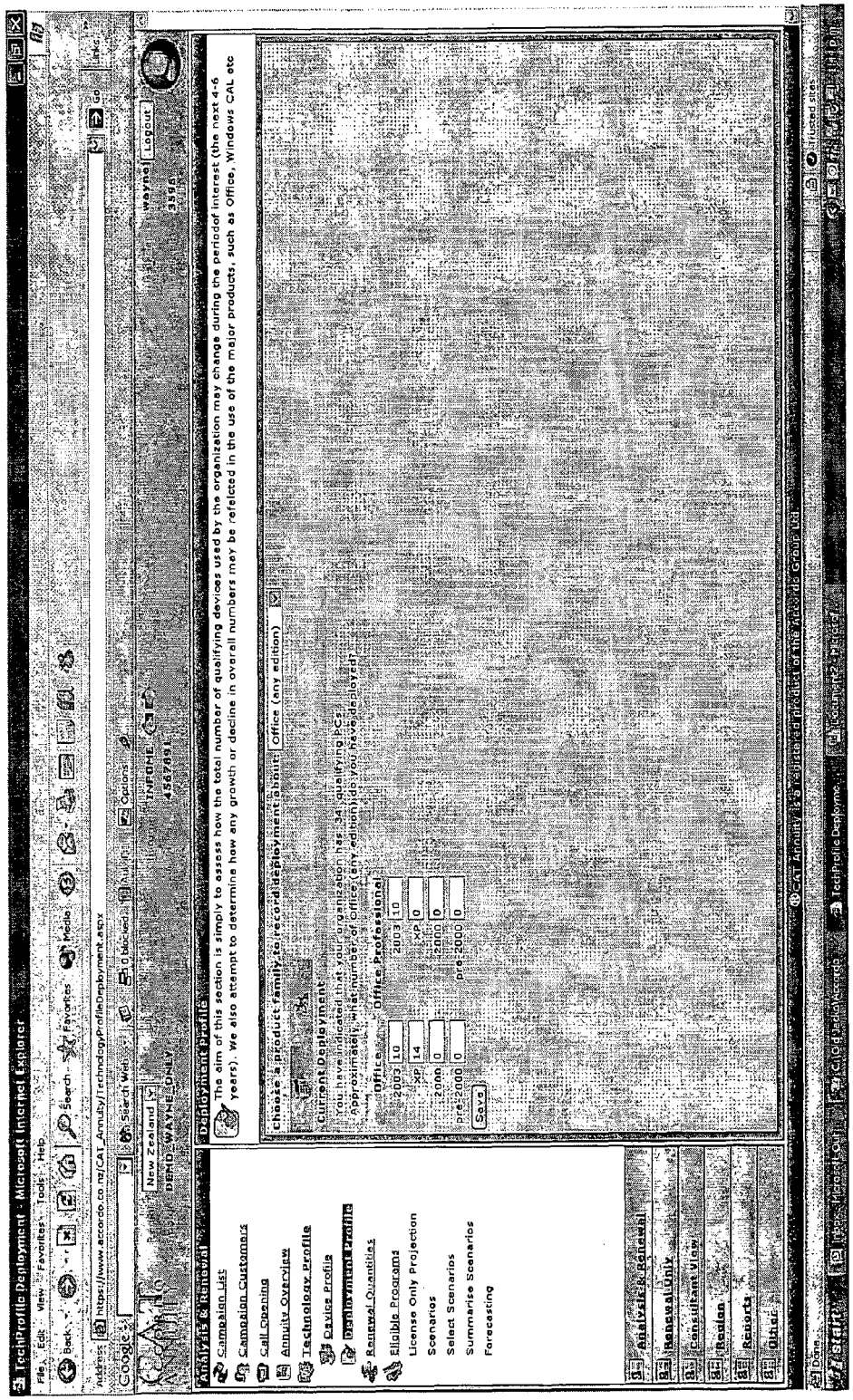
FIG. 9: shows a screenshot illustrating how the present software deployment profile of a customer can be captured.

FIG. 9 shows a screen for the capture of the deployment profile. The deployment profile captures the actual products currently deployed and the quantity of each. This information shows the current actual license requirement, and also serves as a background for assessing the likelihood of future deployments. For example, if a customer currently owns the latest version of a product, but has to date only deployed an older version, then they still have a version that could be deployed in the future without any further purchase requirement.

Figure 10:
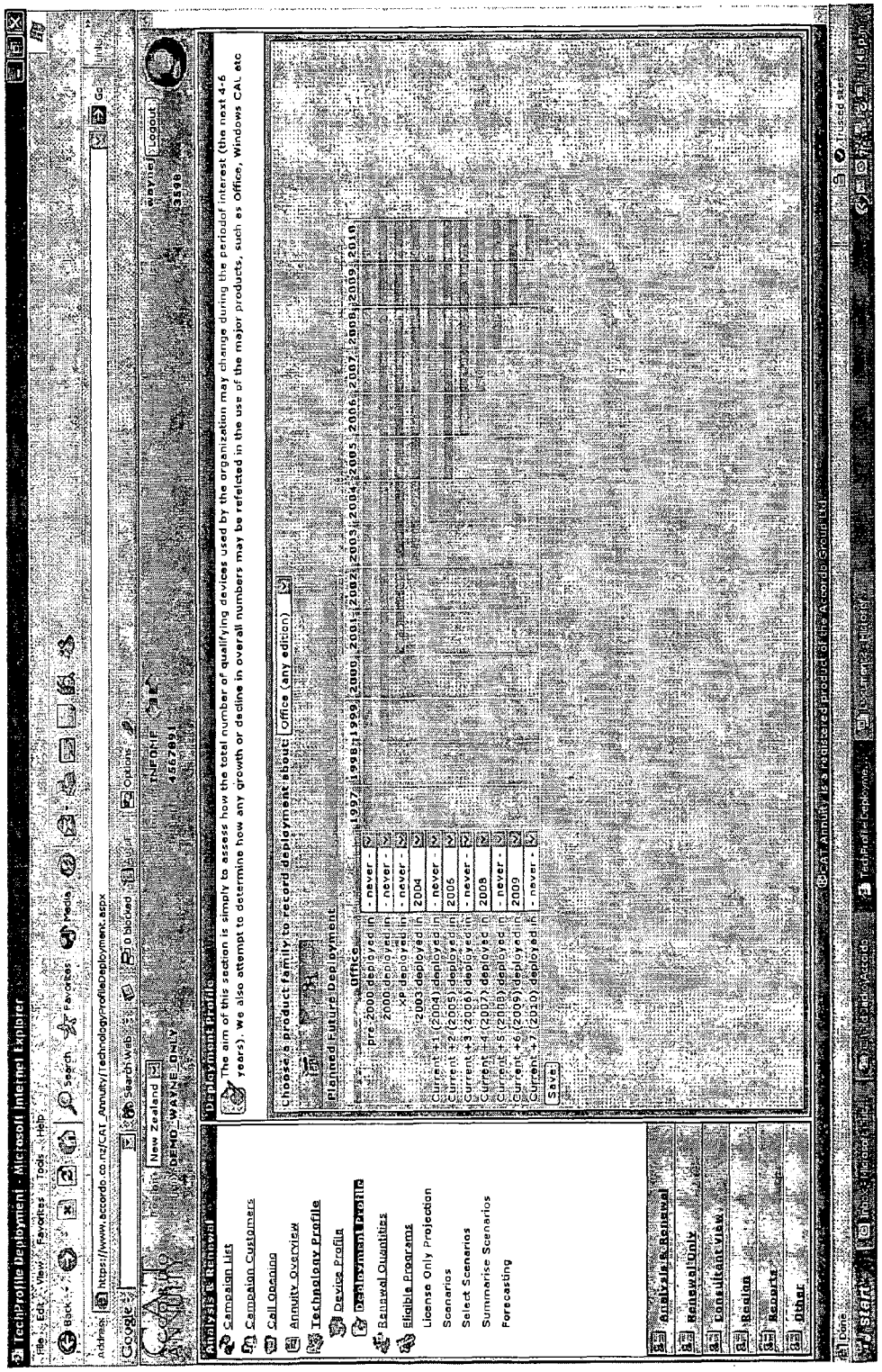
FIG. 10: shows a screenshot illustrating how the future software deployment profile of a customer can be captured.

FIG. 10 shows a screen for the capture of the future deployment profile. The capture of future deployment quantifies exactly which-versions the customer intends to deploy, and at which time in the future. By distinguishing between those planned deployments for which the customer already owns licenses (earned under an annuity contract) and those for which no licenses are currently held, the relative costs associated with renewal and non-renewal can be assessed.

A modelling engine is used to generate renewal options for the customer.

Figure 11:
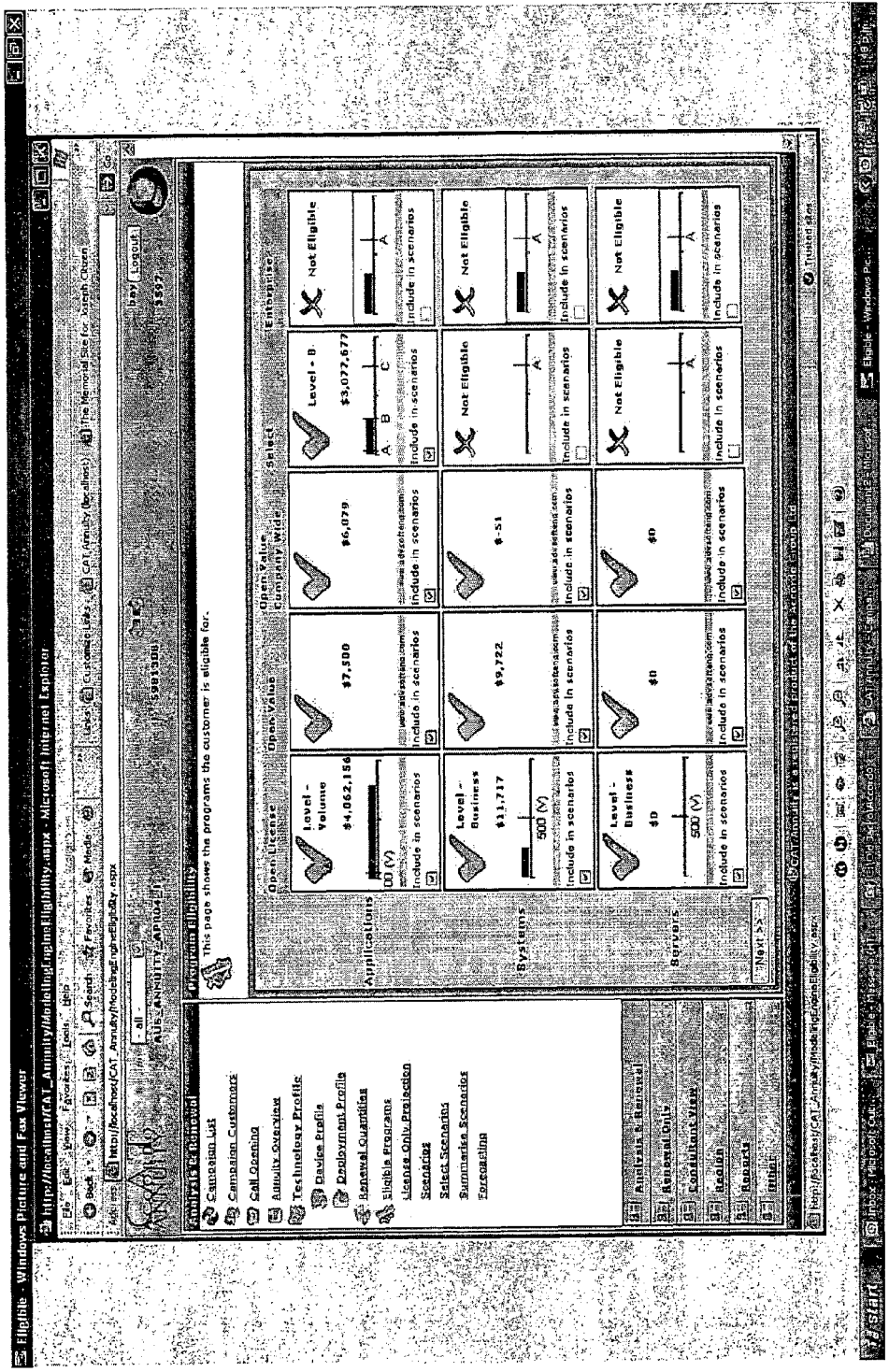

All the eligible programs for a customer are displayed as shown in FIG. 11. A user can select appropriate programs for a customer based on value (e.g. side-benefits, as opposed to cost), or appropriate programs can be automatically selected by ranking the scenarios based on cost.

Figure 12:
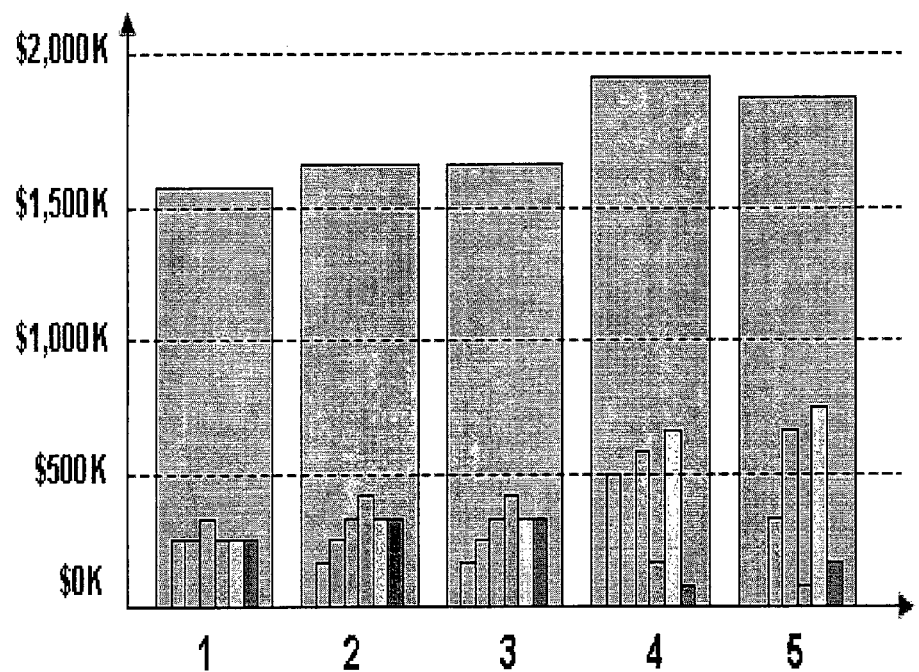
FIG. 12: shows a screenshot displaying a summary of licensing scenarios for the customer.

A summary of the selected programs provided within scenarios is shown in FIG. 12. Different vendors may classify products into groups and apply license program rules differently for each grouping. For example desktop applications may form one group and server-based products another. The purpose of the modelling engine is to take the planned products and quantities, and calculate the costs associated with each product group under the various eligible licensing program options. Having identified the eligible options for each product group, these now need to be combined to produce licensing scenarios to cover all product groups for which renewals are planned.

The Eligible Programs screen may identify programs as follows:

|  | Program | | | |
| --- | --- | --- | --- | --- |
| Product Group | Program A | Program B | Program C | Program D |
| Product Group X | Eligible | Not Eligible | Eligible | Not Eligible |
| Product Group Y | Eligible | Eligible | Not Eligible | Not Eligible |
| Product Group Z | Not Eligible | Eligible | Not Eligible | Eligible |

To license all products require a combination of licensing programs to cover all product groups for which purchases are planned.

Based on the above pattern of eligibility, the total possible licensing scenarios are as follows:

|  | Product Group | | |
| --- | --- | --- | --- |
| Scenario | Product Group X | Product Group Y | Product Group Z |
| Scenario 1 | Program A | Program A | Program B |
| Scenario 2 | Program A | Program A | Program D |
| Scenario 3 | Program A | Program B | Program B |
| Scenario 4 | Program A | Program B | Program D |
| Scenario 5 | Program C | Program A | Program B |
| Scenario 6 | Program C | Program A | Program D |
| Scenario 7 | Program C | Program B | Program B |
| Scenario 8 | Program C | Program B | Program D |

Each Product Group/Program combination will have total and annual costs associated with it, and these are combined to find the costs associated with each Scenario. The Scenarios can be ranked according to total cost, or such other factors as might suit the customer under consideration, such as first year cost.

An option is selected for/by the customer and the customer's forecast is updated.

In addition, reports of campaign activity can be generated for the Vendor Subsidiary or viewed by the user.

Figure 13:
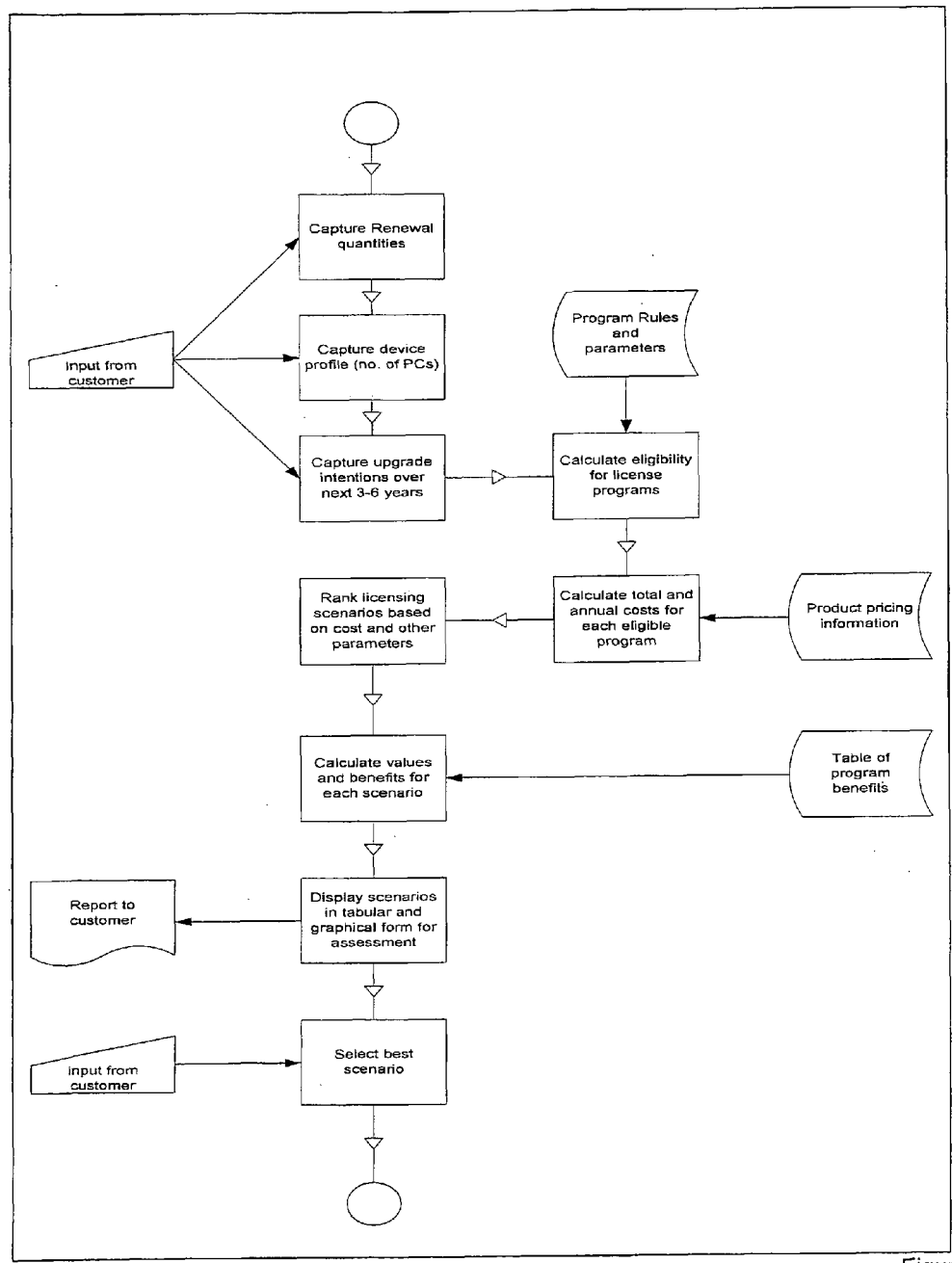
FIG. 13: shows a flow diagram illustrating operation of the modelling engine.

Referring to FIG. 13, a modelling engine according to a method of the invention will be described.

The modelling engine takes as input renewal quantities, device profile of the customer (i.e. no of PCs), and upgrade intentions over a time period (such as the next 3 to 6 years). The input can come from the interaction with a customer as described in FIG. 8 to 10.

The engine uses this input and program rules and parameters, which describe the requirements for the licensing programs, to calculate which of the programs the customer is eligible for.

The engine calculates total and annual costs for each eligible program using product pricing information.

The possible renewal scenarios are ranked based on their cost and other parameters.

The engine calculates values and benefits for each scenario using a table of program benefits.

The scenarios are displayed in graphical form for comparison and assessment purposes. After identifying all possible licensing scenarios and associated total and annual costs, the system will select a short-list of the most favourable scenarios to be isolated for graphical and tabular comparison. The screen used to show this comparison uses a histogram format to show total costs for each short-listed scenario, and also embeds a histogram of annual costs within the bar of each total cost. The aim of the comparison screen is to allow for scenarios to be compared both on the basis of total and annual costs. This comparison screen may also show the total value associated with each scenario. The value is calculated on the basis of the total licenses delivered by each scenario, together with any benefits included under the licensing programs involved, Such benefits may include support options and training options.

The scenarios can be reported to the customer and the customer can select the best scenario.

Figures 14, 15:
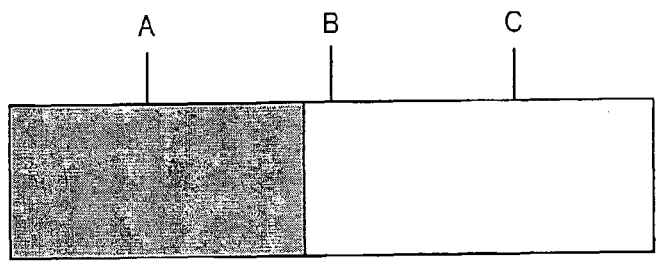
FIG. 14: shows a graphical indicator for compliance with a licensing scheme.
FIG. 15: shows the result of clicking the graphical indicator in FIG. 14.

Referring to FIG. 14, a method of displaying compliance with a licensing scheme will be described.

Some licensing schemes have levels where if a customer has a certain number of devices (such as PCs) the customer moves to a higher level. At the higher level the customer may be entitled to cost savings.

The levels may also be based on points. A customer accrues points by purchasing licenses.

It would be useful to have a graphic which displays the levels and actual customer devices in a simple format so that a user can ascertain how close a customer is to the next highest level. If the customer is close to the next highest level it may be cost effective for the customer to purchase licenses for additional device, even though the customer may not have these devices, in order to obtain the cost savings of the higher licensing level.

A graphic representing the various levels of the scheme is displayed. The graphic may display all the levels of the scheme or it may display the most relevant levels according to the actual customer device numbers (i.e. the current level and the next highest level).

The graphic is a measurement bar which shows marks where the levels are. It will be appreciated that other measurement graphics, such as odometers, may be used.

The graphic is filled up according to the actual customer device numbers.

The graphic is clickable and a user can access the exact details of the device numbers required for the levels and the exact actual customer numbers as shown in FIG. 15.

Details showing the cost difference between purchasing additional licenses to attain the next level and savings achieved from the next level, and present cost according to the current level can also be shown.

Figure 16:
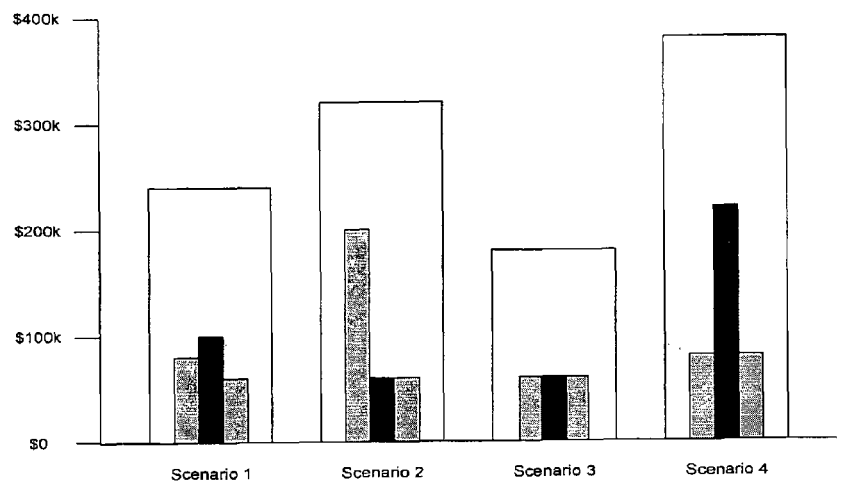
FIG. 16: shows a graphical representation of licensing scenarios.

Referring to FIG. 16, a method of displaying a summary of the licensing scenarios will be described.

Some licensing programs have different year-to-year costs. It can be useful to a user to display, not only the total cost of the licensing program, but the annual costs of the licensing program to assist selection of an appropriate scenario for a customer.

The total cost of each licensing program is displayed as a bar on a bar graph. The annual licensing costs of each program are displayed overlaid on the bar in smaller, differently coloured bars.

Each bar may be clickable to display exact details of the total and annual costs.

Figure 17:
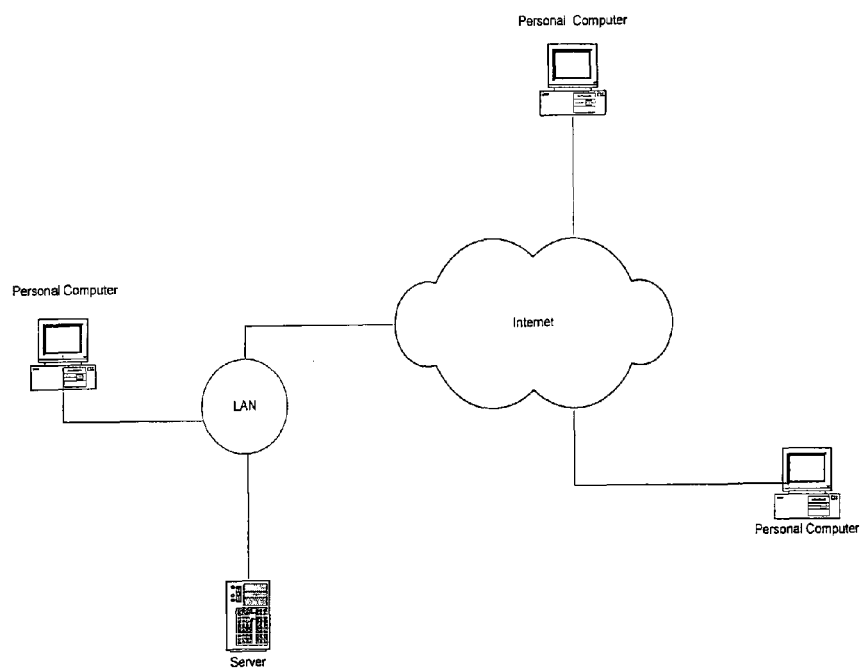
FIG. 17: shows a hardware deployment for the invention.

FIG. 17 shows how the invention can be deployed on hardware.

The system is executed on a secure web server.

Users can access the system over a LAN using a web browser executing on personal computer. In addition, users can access the system over the Internet using a web browser executing on a personal computer.

It will be appreciated that the system may be deployed in a variety of different hardware configurations.

The present invention includes two major components to specifically cater for annuity renewal management.

1. Annuity Customer and Campaign Management—consisting of the following sub-components:
   a. Classify annuity customers according to their overall annuity value, and also their total annuity potential. This is done by assessing the potential dollar value of all existing annuity licenses and thereby extrapolating the value associated with their renewal. Annuity potential relates to licenses owned but not currently covered by annuity contracts. The potential value is the value of these licenses if they were to be placed under annuity at some future time.
   b. Build annuity renewal campaigns. Campaigns are built using several vendor-chosen parameters—the customer segment to be targeted (e.g. medium sized customers), the annuity expiry window to be targeted (e.g. expiring within the next three months), the number of customers (e.g. those with expiring annuity worth more than $5,000). Once the campaign parameters are decided, the customer list is extracted and contact details added from the vendor contact database. An initial forecast record is created (e.g. 20% of current annuity value).

c. Customer-Ready annuity report. Once the campaign list is decided, a report is sent to the customer detailing their annuity transactions and highlighting those which are about to expire.

d. Campaign calling screens. This is a set of web-browser screens designed to be used by callers contacting customers to discuss renewal of their annuity licenses. These screens also cater for the gathering of key information from the customer. The information gathered constitutes as technology profile of the customer and includes existing deployment details, PC count, forecasted PC growth or decline, and future deployment intentions. The screens provide the caller with background information to help prompt accurate and relevant responses from the customer. The information gathered is used as input to the modelling phase (described below) which determines and analyses future annuity renewal options available to this customer.

e. Monitor Campaign Progress. Once a customer is in a campaign and has a renewal forecast record assigned, CAT Annuity monitors monthly sales data to detect subsequent annuity purchases and reconcile these against forecast expectations.

2. Annuity Modelling Engine—consisting of the following sub-components:

a. Calculation of eligible programs by product pool. Having gathered the technology profile information described in 1d above, the CAT Annuity modelling engine takes the proposed renewal quantities, any indicated new annuity purchases, plus forecasted growth and calculates which license programs this customer is eligible for. Eligible programs are displayed graphically with key features highlighted— such as total cost under this program, and proximity to higher or lower discount levels. A full licensing scenario for a particular customer will consist of a combination of programs for each product pool that the customer requires. This display of eligible programs also provides for a particular program to be included or not when total licensing scenarios are constructed.

b. Assessment and display of best licensing scenarios. For example, in the Microsoft case, there are three product pools—Applications, Servers and Systems. Having calculated which programs a customer is eligible for in each of these pools, the best combination needs to be identified to provide coverage of all relevant product pools. If a customer is eligible for say 5 programs in each pool, this means there are 5×5×5=125 possible licensing scenarios available. CAT Annuity calculates the costs associated with each combination, applies some rules relating to allowable combinations, and displays the best scenarios in ranked order. The ability to view all scenarios and drill down on details of cost and value is also provided.

c. Calculation of License-Only costs. If a customer opts not to renew annuity, then they lose the coverage which automatically earns new versions. Under these circumstances they need to acquire any new versions required by purchasing new licenses. This is known as the License-Only option. CAT Annuity takes the deployment intentions gathered as part of the technology profile and calculates the costs associated with acquiring these new versions as full licenses. This License-Only cost breakdown is then used, as appropriate, as a comparison to the various annuity scenarios calculated in 2b. The intention is to provide customers who are weighing up whether or not to renew with a comparative analysis including the cost of not renewing.

The present invention has several advantages, including simplifying and methodizing the annuity renewal process, supporting the selling of new annuity licenses, the ability to model complex license agreement scenarios, and the ability to produce accurate annuity recommendations to customers.

By providing a method for classifying customers into target groups, extracting the highest priority customers from a group, and managing the contact with these customers by outbound callers, the present invention has the advantage that customers are targeted methodically and the interaction is well-managed and supported.

The modeling engine aspect of the invention permits the automation of very complex pricing schemas and sophisticated license program rules, and results in the generation of the most cost-effective licensing scenarios for the customer. This automated modeling has the additional advantages of speed and accuracy.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A computer implemented method of managing software license annuity renewals, including the steps of:
   i) classifying customers using sales transaction data;
   ii) collating the customer classification data into a customer database by means of a processor;
   iii) generating a list of customers using customer data extracted from the customer database;
   iv) generating a software license annuity renewal revenue forecast for each customer on the generated list;
   v) contacting the customers on the list to obtain customer profile data;
   vi) generating software license annuity renewal options for each customer using customer profile data;
   vii) receiving an option selected by each customer;
   viii) updating each software license annuity renewal revenue forecast using the corresponding selected option;
   ix) comparing the progress of each customer with the corresponding software license annuity renewal revenue forecast using customer purchase data extracted from the sales transaction database; and
   x) collating the comparison data from step (ix) into the customer database,
   wherein at least steps iii), iv), vi), viii), ix) and x) are performed by the processor.

2. The method as claimed in claim 1 wherein the customers are classified in step (i) by also using customer data from the vendor.

3. The method as claimed in claim 1 wherein the sales transaction data is from the vendor.

4. The method as claimed in claim 1 wherein the customer data comprises the customer classification data.

5. The method as claimed in claim 3 including the step of ranking the licensing scenarios using cost and/or other parameters.

6. The method as claimed in claim 3 including the step of calculating values and benefits for each scenario.

* * * * *